Feb. 4, 1930.        J. BOBO        1,746,140
AIRPLANE WING
Filed Sept. 2, 1927
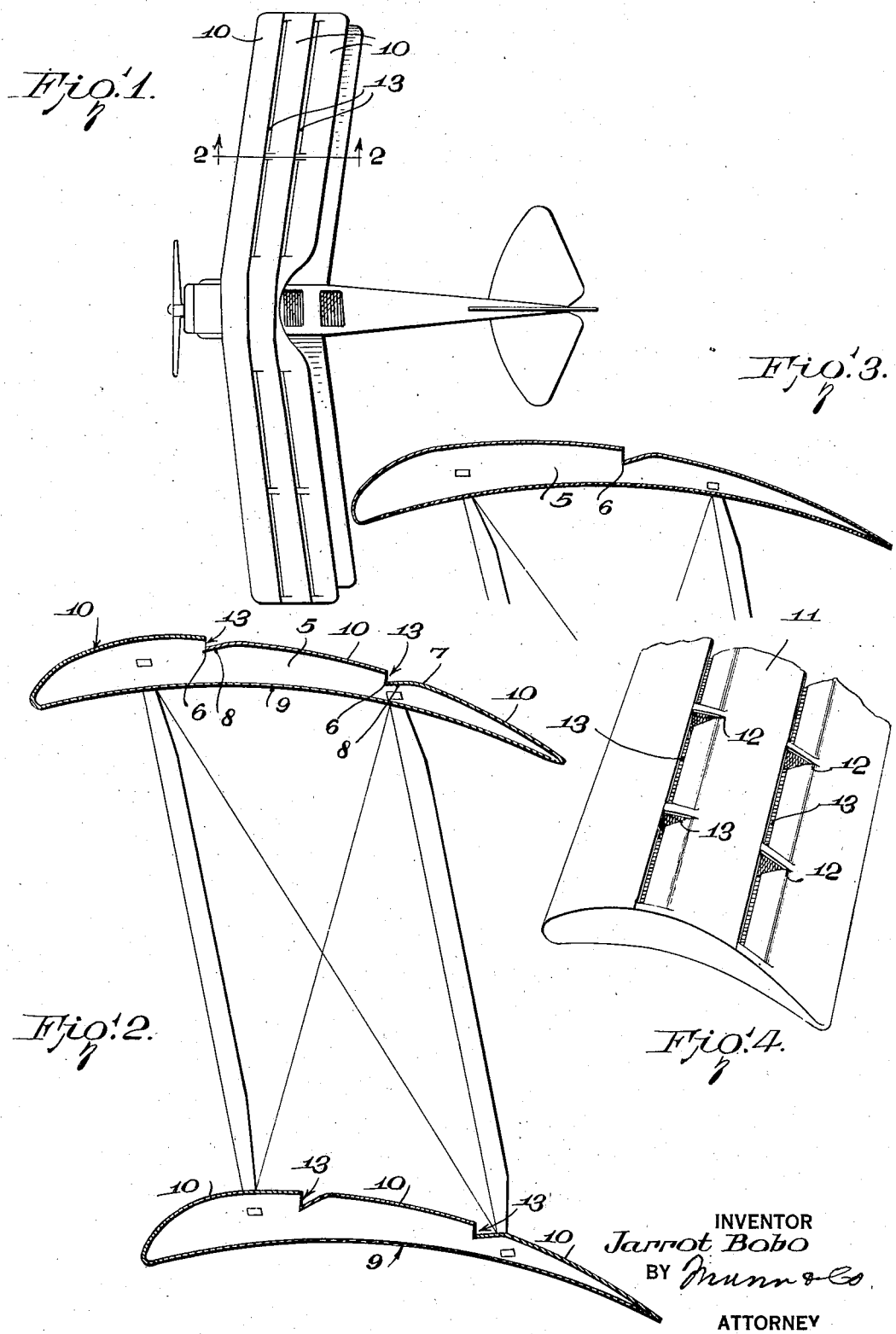
INVENTOR
Jarrot Bobo
BY
ATTORNEY Patented Feb. 4, 1930

1,746,140

UNITED STATES PATENT OFFICE

JARROT BOBO, OF CARPENTER, OHIO

AIRPLANE WING

Application filed September 2, 1927. Serial No. 217,194.

My invention relates to airplanes and more particularly to an airplane wing or plane.

An object of this invention is to provide an airplane wing or plane constructed to produce a maximum vacuum over the wing surface and hence increase its lifting power to a maximum.

The invention further contemplates an airplane wing or plane wherein the wing or plane surface is made in a plurality of sections arranged in stepped relation affording air passages between the sections which, incident to the velocity of the travelling airplane, creates a maximum vacuum over the entire wing or plane surface.

With the preceding and other objects and advantages in mind, the invention consists in the novel combination of elements, constructions and arrangement of parts to be hereinafter specifically referred to, claimed and illustrated in the accompanying drawings, wherein:

Figure 1 is a top plan view of an airplane whose wings are constructed in accordance with my invention;

Figure 2 is a transverse sectional view of the same;

Figure 3 is a similar view illustrating the plane or wing covering made in two sections, and Figure 4 is a fragmentary perspective of the invention.

Referring to the invention in detail a plurality of conventional concavo convex parallel wing ribs 5, having transversely alined notches 6 upon its upper surface, is provided. These notches 6 are arranged equidistant from the ends of the ribs and have straight vertical walls 7 and obliquely disposed bottom or base walls 8. As illustrated in Figure 2 these notches 6 are disposed in stepped relation.

A wing or plane covering 9 extends across the under face of the ribs with its end portions 10 extended reversely over the upper surfaces of the ribs to the vertical walls of the notches 6.

An intermediate sheet 11 formed of wing or plane covering material is provided which is secured to the upper surfaces of the ribs and extends from the vertical wall 7 of one notch to the vertical wall of the other. To provide openings between the ends of the end portions 10 and the end of the intermediate section 11, the forward end of this intermediate section and the end portion 10 are extended obliquely as at 12, and are secured upon the base or bottom walls 8 of the notches. As illustrated in Figure 3 the forward end of the section 11 and rear end portion 10 are provided with V-shaped incisions 12ª to provide clearances for the wing frame members 5. It will be seen that the longitudinal edges of the plane or wing covering 9 and the longitudinal edges of the wing covering section 11 are spaced throughout the entire length of the wing and provide longitudinal passage ways 13, which are disposed in stepped relation.

In the embodiment of the invention disclosed in Figure 3 a single notch 14 is provided and the wing or plane covering extended to the vertical wall of the notch to afford a single longitudinal passage 15 extending the entire length of the plane or wing at a point centrally of its longitudinal edges.

As is well known, in the art of aeronautics, a vacuum is produced over the upper face of the airplane wing or plane incident to the air currents passing over the same, which coact with the lifting pressure upon the under face of the wing or plane in sustaining the airplane in flight. With my invention this vacuum and consequential lifting power is increased to a maximum due to the fact that, in addition to the air currents, a vacuum over the upper surface of the wing or plane produces a vacuum within the latter.

What is claimed is:

1. In an airplane wing a plurality of parallel transversely extending wing ribs having transversely alined notches in their faces, and a wing covering extending over both faces of the ribs and stopping at the notches to provide a plurality of longitudinal passages which, due to air currents passing over the upper face of the wing incident to the movement of an airplane to which the wing is attached, produces a lifting vacuum within the wing.

2. In an airplane wing, a plurality of concavo convex parallel ribs having notches in their upper faces disposed in transverse alinement, a wing covering extending over the under face of the ribs and having end portions which overlie the convex faces of the ribs and extend to the notches, and an intermediate plane covering section extending over the convex surfaces of the ribs from one notch to the other whereby the opposite longtudinal edges of said section with the ends of the wing covering providing spaced longitudinal passages, which incident to the movement of the wing in flight create a vacuum within the wing to assist in maintaining it in flight.

3. In an airplane wing, a plurality of parallel ribs having transversely alined recesses in their upper faces whose bottom walls are obliquely disposed, a wing covering extended across the under face of the ribs and having its end portions extended upon the upper face of the ribs to the notches, an intermediate wing covering section extended across the upper face of the ribs and extending to the notches, the forward edge of the wing covering section and rear end portion being extended obliquely secured to the obliquely disposed walls of the notches.

Signed at Carpenter in the county of Meigs and State of Ohio this 29th day of August, A. D. 1927.

JARROT BOBO.